US008316062B1

(12) United States Patent
Sipher et al.

(10) Patent No.: US 8,316,062 B1
(45) Date of Patent: Nov. 20, 2012

(54) SHARED DISTRIBUTION LISTS FOR DISTRIBUTION OF AUDIO CONTENT USING MOBILE TELECOMMUNICATION DEVICES

(75) Inventors: Joseph K. Sipher, Sunnyvale, CA (US); Jocelyn F. Cloutier, Menlo Park, CA (US)

(73) Assignee: Pinger, Inc., San Jose, CA (US)

( * ) Notice: Subject to any disclaimer, the term of this patent is extended or adjusted under 35 U.S.C. 154(b) by 693 days.

(21) Appl. No.: 11/852,050

(22) Filed: Sep. 7, 2007

(51) Int. Cl.
*G06F 7/00* (2006.01)

(52) U.S. Cl. .................................................... 707/804

(58) Field of Classification Search .................. 707/104, 707/804, 802, 999.102
See application file for complete search history.

(56) References Cited

U.S. PATENT DOCUMENTS 6,011,833 A 1/2000 West
6,246,752 B1 6/2001 Bscheider et al.
6,564,264 B1 * 5/2003 Creswell et al. .............. 709/245
6,643,355 B1 11/2003 Tsumpes
6,950,502 B1 9/2005 Jenkins
6,990,094 B1 1/2006 O'Neal et al.
7,627,608 B2 * 12/2009 Strandell et al. ...................... 1/1
2002/0080413 A1 * 6/2002 Sommerer .................... 358/402
2002/0143879 A1 * 10/2002 Sommerer .................... 709/206
2003/0158860 A1 * 8/2003 Caughey ....................... 707/200
2005/0020250 A1 1/2005 Chaddha et al.
2005/0172033 A1 * 8/2005 Mathew et al. ............... 709/246
2005/0198171 A1 * 9/2005 Landsman et al. ............ 709/206
2006/0018441 A1 1/2006 Timmins et al.
2006/0031340 A1 * 2/2006 Mathew et al. ............... 709/206
2006/0198504 A1 9/2006 Shemisa et al.
2006/0240868 A1 * 10/2006 Kaplan et al. ................. 455/558
2007/0050456 A1 * 3/2007 Vuong et al. .................. 709/206
2007/0150542 A1 * 6/2007 Sommerer .................... 709/206
2008/0222127 A1 * 9/2008 Bergin ............................. 707/5
2009/0227289 A1 * 9/2009 Celik ........................... 455/558
2010/0306185 A1 * 12/2010 Smith et al. ................... 707/709

* cited by examiner

*Primary Examiner* — Kimberly Wilson
*Assistant Examiner* — Mohammed R Uddin
(74) *Attorney, Agent, or Firm* — Raubvogel Law Office

(57) ABSTRACT

A method and system for automatically populating contact information using an voice message addressed to a distribution list. In one example method, a new distribution list is identified that contains the telephone numbers or other contact information of a group of intended recipients. The contact information for the recipients is identified, and the contact information databases at least one of the recipients is automatically populated with the contact information of the other recipients and/or the distribution list information.

23 Claims, 3 Drawing Sheets

SHARED DISTRIBUTION LISTS FOR DISTRIBUTION OF AUDIO CONTENT USING MOBILE TELECOMMUNICATION DEVICES

BACKGROUND

1. The Field of the Invention

The present invention relates generally to messaging and personal information manager systems. More specifically, the present invention relates to methods and systems for automatically updating the contact information of a personal information manager with distribution list information.

2. The Relevant Technology

Computers and computing systems have affected nearly every aspect of modern living. Computers are generally involved in work, recreation, healthcare, transportation, entertainment, household management, etc. The functionality of computers has also been enhanced by their ability to be interconnected through various network connections. The networking of computers has allowed computers to exchange data using server-client relationships.

Email is a common tool used to exchange data between computers and individuals. The ubiquitous nature of email has changed the way people communicate with one another. Many advancements have been made to make the use of email more convenient and reliable. For example, users are now able to access email via their mobile telephones, and many email providers have now incorporated various features, such as searching and organizing tools, into their email systems.

Contact lists are often compiled by users to provide quick access to contact information for a large number of potential recipients. When a message is created, a user can quickly select the intended recipients from the previously compiled contact list. Contact lists can also be used for making phone calls, sending SMS messages, instant messages (IMs), and the like. In order to add new information to a contact database, a user is typically required to manually submit the information, either via a telephone or computer interface. Consequently, valuable time can be wasted when a user is required to manually add new contact information.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

These and other limitations are overcome by embodiments of the invention, which relate to the automated updating of contact list information with the information included in a distribution list that is used to send a voice message to multiple recipients. One embodiment is directed to a method of automatically populating contact information. The method may be practiced, for example, in a personal information manager containing a database of contact information of one or more message recipients. The method includes identifying a new distribution list created by a user and containing the contact information of a group of recipients. The method identifies the contact information for the group of recipients, and automatically populates contact information databases of at least a portion of the group of recipients with the identified contact information.

An additional embodiment described in more detail herein includes another method of automatically populating a database of contact information for a recipient of a voice message. The method includes identifying a new distribution list created by a user and containing contact information of a group of recipients. The method automatically populates contact information databases of at least a portion of the group of recipients with the new distribution list.

A further embodiment is directed to a method of facilitating the automatic population of contact information of a recipient of a voice message. The method may be practiced, for example, at a personal information manager associated with a sender of a voice message. The method includes identifying a distribution list containing contact information of intended recipients, wherein an electronic message addressed to the distribution list is sent to each of the intended recipients. The method populates the distribution list with information that is configured to automatically populate a contact information database of the recipient the contact information and/or the distribution list. Then, the method sends the electronic message to the intended recipients using the contact information contained within the distribution list.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Embodiments of the present invention provide for methods and systems for automatically populating contact information in a messaging system for mobile telephones and other computing devices. When a message is received, if the message is addressed to a distribution list containing contact information for multiple recipients, then the distribution list information is automatically added to the contact list database of the recipient of the message. The present invention may be used for facilitating the connection of a large group of people. As messages are sent to multiple recipients, the address books of each of the recipients is automatically populated with the contact information of the other recipients in order provide a connection between all of the recipients.

Figure 1:
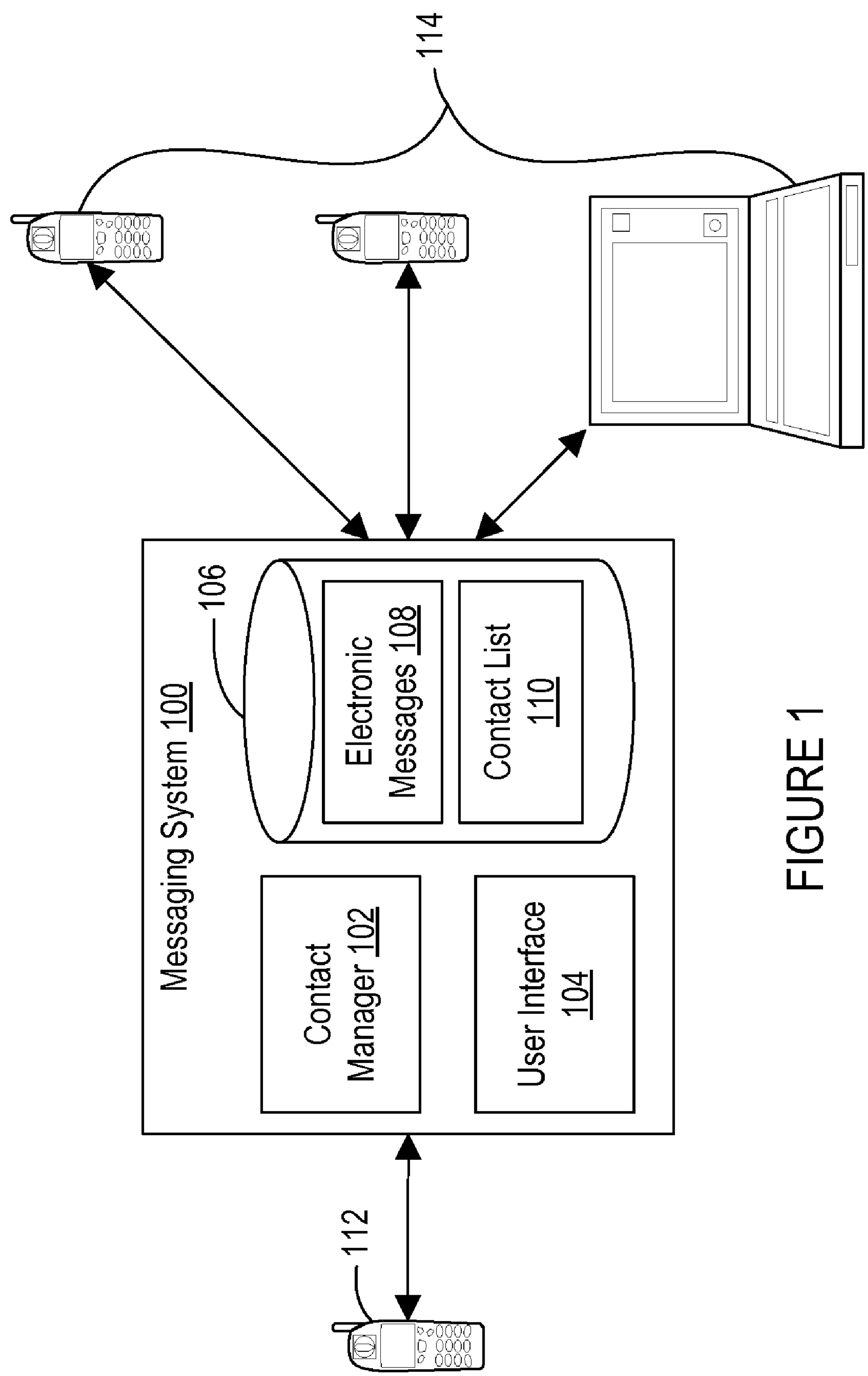
FIG. 1 illustrates a messaging system for automatically updating contact information, in accordance with the present invention.

Referring now to FIG. 1, a more detailed example is illustrated using a diagrammed reference of one embodiment of a messaging system 100 wherein the present invention may operate. Although the messaging system 100 may be used to send and receive messages in a variety of formats, the present invention will primarily be described in terms of sending and receiving electronic messages, such as voice messages, emails, SMS messages, and the like. In general, the messaging system 100 receives an electronic message from the mobile telephone or other computing device of a sender 112 that may be addressed a distribution list that includes multiple recipients 114. The messaging system 100 may automatically update the contact lists 110 of each recipient 114 to include the contact information for the sender 112 and/or each of the other recipients 114 of the electronic message. Furthermore, the messaging system 100 may automatically populate the contact lists 110 of each of the recipients 114 with the distribution list information so that the recipients 114 may easily send new messages to the entire distribution list.

The messaging system 100 may include many of the features common to personal information managers, such as calendar data, contact information 110, task lists, journal data, notes, and the like. Examples of personal information managers may include Microsoft Outlook, ContactOffice, Lotus Notes, Mozilla Thunderbird, Mac OS X Address Book, and the like. The messaging system 100 may include a customized personal information manager developed to perform the additional functionalities disclosed in the present invention.

In addition to receiving and sending traditional voice messages, the messaging system 100 may further be configured to send and receive audio content that shares properties of both email and voice messaging systems. For example, the messaging system may allow audio a user to create voice messages that may be delivered directly to the recipient's email inbox. Furthermore, the user interface 104 of the messaging system 100 may allow a user to organize and access voice messages in a format that is similar to many traditional email interfaces. The messaging system 100 may also allow a user to send, receive, and organize voice messages entirely via mobile telephones, while retaining many of the benefits of an email interface, such as the ability to utilize contact information 110 when creating, replying to, forwarding, and organizing messages.

In one embodiment, the messaging system 100 may act as a central server for providing services to multiple users. The central server may include a storage medium 106 for storing messages 108, contact lists 110 (e.g., address books), and the like for multiple users. When a recipient 114 receives an electronic message from a sender 112, the message is stored within the storage medium 106. The storage medium 106 may store electronic messages 108 for one or more recipients 114, and may be located at a central repository that may be remote from any individual user. The storage medium 106 may be one of many mediums that are commonly employed in the art to store data. Examples include, but are not limited to, disk storage (e.g., optical disks, hard disks, floppy disks, zip disks, and the like), tape storage (e.g., magnetic tape), solid state memory devices (e.g., flash memory, EEPROM, and the like), as well as any other storage medium currently known in the art or developed in the future.

The storage medium 106 includes a contact list database 110 for storing contact information for one or more users of the messaging system 100. The contact information database 110 may include information for identifying people, businesses, places, and the like, as well as telephone numbers, physical addresses, electronic (email, instant messaging) addresses, and the like. The contact information database 110 may be stored on the same storage medium 106 as the messages 108, as illustrated and FIG. 1, or may alternatively be located at a separate location and may be accessible over a network.

The messaging system 100 may further include a contact manager 102 for automatically maintaining and updating the user's contact information 110. In particular, the contact manager 102 automatically updates a user's contact information 110 with new distribution lists that are received as a part of an incoming electronic message. When a sender of a message sends a message to two or more recipients 114, it is often efficient to create a distribution list containing the contact information of each of the intended recipients 114. The information included in a distribution list may include the telephone numbers of each of the members, as well as other contact information as described previously. After creating the distribution list, the sender can simply address subsequent messages to the distribution list, and the messages will be sent to each member of the distribution list.

Upon receiving a message that is addressed to a distribution list, the contact manager 102 automatically adds information regarding the distribution list to the recipients' contact information 110. For example, a single new entry may be added to the recipients' 114 contact list 110 that contains all of the contact information included in the distribution list. By automatically adding the distribution list to the recipient's 114 contact list 110, the recipient can subsequently create a new message addressed to the distribution list without being required to manually enter each intended recipient's 114 electronic address, and without being required to reply to or forward the original message addressed to the distribution list.

In another embodiment, the contact manager 102 may further extract the contact information for each of the members of the distribution list, and create new individual entries in the recipient's 114 contact list 110 for each of the members. By automatically creating new contact list 110 entries for each of the members of the distribution list, the recipient 114 can subsequently create a new message addressed to a member of the distribution list without being required to manually enter the electronic address for the intended recipient 114, and without being required to retrieve the contact information for the intended recipient 114 from the original message containing the distribution list.

As described above, the process of adding distribution list information to a contact list 110 may be perform autonomously. Therefore, as soon as a message is received by the messaging system 100, or alternatively, opened by the recipient 114, the contact manager 102 may automatically update the recipient's 114 contact list 110 with the distribution list information without any additional input from the recipient 114. In another embodiment, the contact manager 102 may prompt the recipient 114 prior to adding the distribution list information to the recipient's contact list 110 in order to allow the user to instruct the contact manger 102 not to add the new distribution list to the contact list 110. The system 100 may provide settings that are selected by the user for defining how the system will handle newly received distribution lists. For example, upon receiving a new distribution list, the system may automatically add the distribution list to the contact information 110, add the distribution list only after receiving an affirmative response to a prompt from the user, or never automatically add the distribution list to the user's contact list information.

In addition to updating the user's contact information 110 with distribution list information, the contact manager 102 may also be adapted to perform additional features, such as automatically updating a contact list 110 with addresses of the sender 112 of the electronic message and other recipients 114 that were not included in a distribution list. In other words, if a message is received that includes multiple intended recipients 114, but the intended recipients have not been compiled into a distribution list, the contact manager 102 may automatically update the user's contact list 110 with the contact information of each of the intended recipients 114, as well as the sender 112 of the electronic message.

Figure 2:
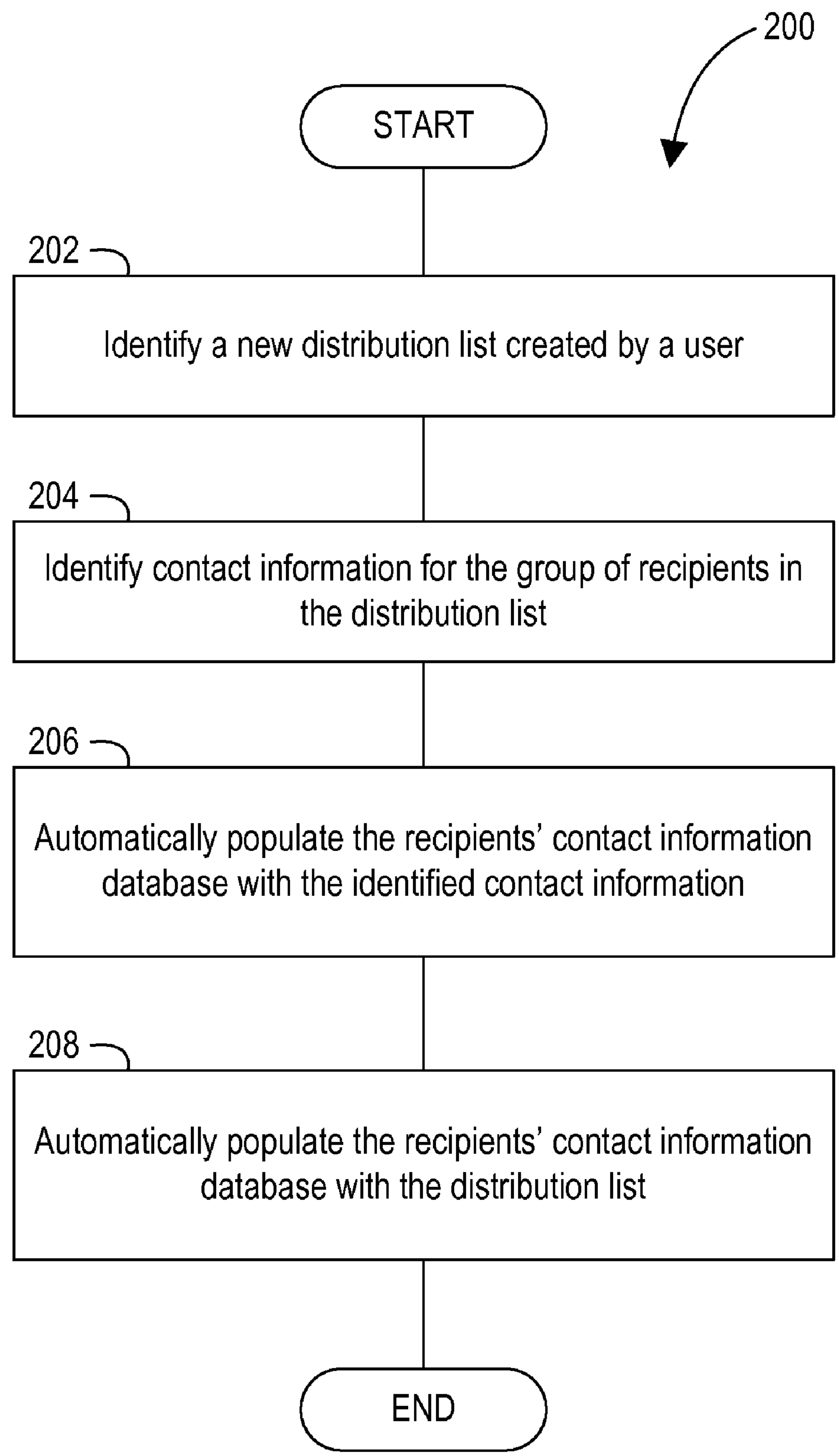
FIG. 2 illustrates a flow diagram of one example method for automatically populating contact information of a recipient of a voice message.

Referring now to FIG. 2, a method 200 is illustrated of automatically populating contact information. The method 200 may be practiced, for example, in a messaging system containing a database of contact information of a first recipient. The personal information manager may include one or more computer-readable media having computer-executable instructions, that when executed, implement the method 200.

The messaging system identifies 202 a new distribution list created by a user. The distribution list contains contact information of a group of recipients that will receive an electronic message addressed to the distribution list.

In one embodiment, the predefined distribution list may include a data structure that contains contact information such as the recipients' physical addresses, telephone and fax numbers, website information, IM addresses, job titles, company names, and the like. In one embodiment, identifying a new distribution list includes receiving an electronic message addressed to the new distribution list from a sender. For example, a voice message may be received from the sender that is addressed to the new distribution list.

As described previously, in one embodiment, the electronic message may include a voice message that includes a digital audio file containing voice data of the original sender of the message. The digital audio file may be created by the sender with a mobile telephone, and may possess many of the properties of an email. The digital audio file may also be addressed to a distribution list addressed to multiple recipients.

The method 200 illustrated in FIG. 2 further includes identifying 204 contact information for the group of recipients. In one embodiment, identifying contact information for the group of recipients further includes extracting the contact information for the group of recipients from a data structure, as described above, which contains the additional contact information.

In another embodiment, identifying 204 contact information for the group of recipients further includes retrieving the contact information from the sender of the voice message. Referring again to FIG. 1, the messaging system 100 may automatically contact the sender 112 of the message to request any additional contact information that the sender may have that was not included in the distribution list. For example, the messaging system 100 may send a request message to the sender 112 of the voice message for the additional contact information, and then receive a response message from the sender containing the additional contact information. By way of example, the distribution list originally included in the message may only include the electronic address of each of the members of the distribution list. By contacting the sender 112 of the message, additional contact information may be extracted, such as telephone numbers, physical addresses, and the like.

In another embodiment, identifying 204 contact information for the group of recipients further includes retrieving the contact information from a central database containing the contact information for multiple users. For instance, all of the necessary contact information may be included in the database 106 that is located at a central messaging server 100. In this case, the contact information for each of the recipients may be retrieved from the database 106.

After the contact information is identified, the method 200 may further include automatically populating 206 contact information databases of at least a portion of the group of recipients with the identified contact information. In addition to adding the contact information of the other recipients, the method 200 may further automatically populate 208 the contact information databases of at least a portion of the group of recipients with the new distribution list.

For example, in one embodiment, the steps 206 and 208 of automatically populating the contact information databases may include populating an address book that the recipients have created and stored at a central server with the contact information of the other recipients. In another embodiment, automatically populating the contact information database may include populating address books stored locally at the recipients' mobile telephones (e.g., 114) with the distribution list and/or identified contact information of the other recipients. In yet another embodiment, the steps 206 and 208 of automatically populating the contact information databases may include populating address books stored locally at a personal computer of the recipients with the identified contact information. By populating a recipient's address book stored on the recipient's computer, the recipient can easily synchronize address books stored on a personal computer, a central server, a mobile telephone, and the like.

Figure 3:
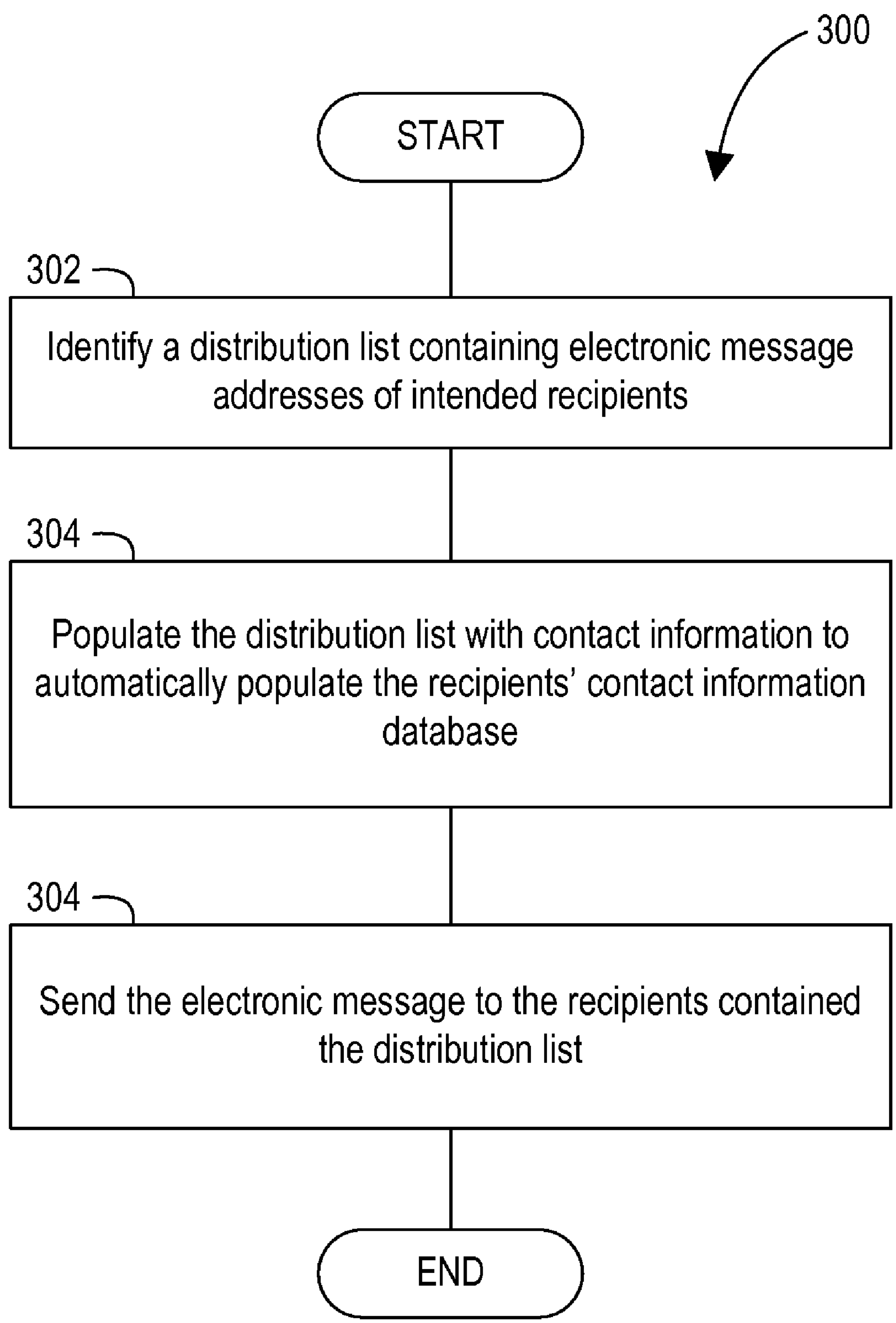
FIG. 3 illustrates a flow diagram of an example method for facilitating the automatic population of contact information of a recipient of a voice message.

Referring now to FIG. 3, a method 300 is illustrated of facilitating the population of contact information of a recipient of an electronic message. The method 300 may be practiced, for example, in a personal information manager associated with a sender of the electronic message. The method 300 prepares a distribution list in a manner that the recipient of the message can easily add the distribution list information to the recipient's contact list database. The personal information manager may include one or more computer-readable media having computer-executable instructions, that when executed, implement the method 300.

The method 300 includes identifying 302 a distribution list containing contact information of intended recipients, wherein an electronic message addressed to the distribution list is sent to each of the intended recipients. The distribution list is populated with information that is configured to automatically populate a contact information database of the recipient with at least one of the contact information and the distribution list. Then, the electronic message is sent 306 to the intended recipients using the contact information contained within the distribution list data structure. When the electronic message is received by the intended recipients, their personal information managers are able to easily access the contact information for each of the members of the distribution list and automatically add the distribution list information to their contact information databases.

Embodiments herein may comprise a special purpose or general-purpose computer including various computer hardware. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or distribution list of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for automatically populating contact databases, the method comprising:

receiving an electronic message addressed to a distribution list comprising a list of recipient members, each recipient member having a contact database;

obtaining contact information for the recipient members; and responsive to receiving the electronic message addressed to the distribution list, automatically populating a contact database of each recipient member of the distribution list by adding, to each recipient member's contact database, contact information pertaining to each other recipient member of the distribution list;

wherein adding the contact information comprises adding, to each recipient member's contact database, at least one new member record which was not present in the recipient member's contact database, the new member record containing contact information of another recipient member.

2. The method as recited in claim 1, further comprising:

responsive to receiving the electronic message addressed to the distribution list, automatically populating a contact database of each recipient member of the distribution list by adding, to each recipient member's contact database, information describing the distribution list.

3. The method as recited in claim 1, wherein obtaining contact information for the recipient members further comprises extracting the contact information for the recipient members from the distribution list, and wherein the contact information added to each recipient member's contact database comprises contact information extracted from the distribution list.

4. The method as recited in claim 1, wherein the obtained contact information comprises at least one of a full name, a job title, a company name, a home address, a business address, a business telephone number, a home telephone number, a fax number, a mobile telephone number, an email address, a webpage address, and an instant messaging address.

5. The method as recited in claim 1, wherein obtaining contact information for the recipient members further comprises retrieving the contact information from a sender of the electronic message.

6. The method as recited in claim 5, wherein retrieving the con-tact information from a sender of the electronic message further comprises:

sending a request message to the sender of the electronic message for the contact information; and receiving a response message from the sender containing the con-tact information.

7. The method as recited in claim 1, wherein obtaining contact information for the recipient members further comprises retrieving the contact information from a central database containing contact information for multiple users.

8. The method as recited in claim 1, wherein adding the contact information to each recipient member's contact database further comprises populating an address book stored locally at the recipient member's mobile device with the contact information.

9. The method as recited in claim 1, wherein adding the contact information to each recipient member's contact database further comprises populating an address book stored locally at the recipient member's computer with the contact information.

10. The method as recited in claim 1, wherein adding the contact information to each recipient member's contact database further comprises populating an address book stored at a central server and associated with the recipient member with the contact information.

11. The method as recited in claim 1, wherein the electronic message comprises a voice message sent from a mobile telephone of a sender.

12. A method for automatically populating contact databases, the method comprising:

receiving an electronic message addressed to a distribution list comprising a list of recipient members, each recipient member having a contact database; and responsive to receiving the electronic message addressed to the distribution list, automatically populating a contact database of each recipient member of the distribution list by adding, to each recipient member's contact database, at least one new member record which was not present in the recipient member's contact database, the new member record describing the distribution list, the distribution list comprising contact information for at least one other recipient member.

13. The method as recited in claim 12, further comprising:

obtaining contact information for the recipient members; and responsive to receiving the electronic message addressed to the distribution list, automatically populating a contact database of each recipient member of the distribution list by adding, to each recipient member's contact database, contact information pertaining to each other recipient member of the distribution list;

wherein adding the contact information comprises adding, to each recipient member's contact database, at least one new member record which was not present in the recipient member's contact database, the new member record containing contact information of another recipient member.

14. The method as recited in claim 13, wherein obtaining contact information for the recipient members further comprises retrieving the contact information from a central database containing contact information for multiple users.

15. The method as recited in claim 13, wherein obtaining contact information for the recipient members further comprises extracting the contact information from the distribution list, and wherein the contact information added to each recipient member's contact database comprises contact information extracted from the distribution list.

16. The method as recited in claim 13, wherein the obtained contact information comprises at least one of a full name, a job title, a company name, a home address, a business address, a business telephone num-ber, a home telephone number, a fax number, a mobile telephone number, an email address, a webpage address, and an instant messaging address.

17. The method as recited in claim 13, wherein obtaining contact information for the recipient members further comprises retrieving the contact information from a sender of the electronic message.

18. The method as recited in claim 17, wherein retrieving the contact information from a sender of the electronic message further comprises:

sending a request message to the sender of the electronic message for the contact information; and receiving a response message from the sender containing the con-tact information.

19. The method as recited in claim 12, wherein adding at least one new record describing the distribution list to each recipient member's contact database further comprises populating an address book stored locally at the recipient member's mobile device with the distribution list.

20. The method as recited in claim 12, wherein adding at least one new record describing the distribution list to each recipient member's contact database further comprises populating an address book stored locally at the recipient member's computer with the distribution list.

21. The method as recited in claim 12, wherein adding at least one new entry describing the distribution list to each recipient member's contact database further comprises populating an address book stored at a central server and associated with the recipient member with the new distribution list.

22. The method as recited in claim 12, wherein the electronic message comprises a voice message sent from a mobile telephone of a sender.

23. A method for automatically populating contact databases, the method comprising:

receiving an electronic message addressed to a plurality of recipients, each recipient having a contact database;

obtaining contact information for the recipients; and responsive to receiving the electronic message addressed to the plurality of recipients, automatically populating a contact database of each recipient by adding, to each recipient's contact database, contact information pertaining to each other recipient;

wherein adding the contact information comprises adding, to each recipient's contact database, at least one new member record which was not present in the recipient's contact database, the new member record containing contact information of another recipient.

* * * * *